US009684726B2

(12) United States Patent
Jamrog et al.

(10) Patent No.: US 9,684,726 B2
(45) Date of Patent: *Jun. 20, 2017

(54) REALTIME INGESTION VIA MULTI-CORPUS KNOWLEDGE BASE WITH WEIGHTING

(71) Applicant: International Business Machines Corporation, Armonk, NY (US)

(72) Inventors: Daniel M. Jamrog, Acton, MA (US); Jason D. LaVoie, Littleton, MA (US); Nicholas W. Orrick, Austin, TX (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/720,809

(22) Filed: May 24, 2015

(65) Prior Publication Data

US 2016/0110364 A1    Apr. 21, 2016

Related U.S. Application Data

(63) Continuation of application No. 14/517,813, filed on Oct. 18, 2014.

(51) Int. Cl.
*G06F 17/30* (2006.01)

(52) U.S. Cl.
CPC .. *G06F 17/30867* (2013.01); *G06F 17/30654* (2013.01)

(58) Field of Classification Search
CPC ............... G06F 17/30654; G06F 17/30867

(Continued)

(56) References Cited

U.S. PATENT DOCUMENTS 8,364,679 B2    1/2013    Resnick
2005/0071741 A1*    3/2005    Acharya ........... G06F 17/30864
715/208

(Continued)

FOREIGN PATENT DOCUMENTS

WO    03098466    11/2003
WO    2012040356    3/2012

OTHER PUBLICATIONS

Weinqian et al., "A New Method for Calculating Similarity between Sentences and Application on Automatic Abstracting," Intelligent Information Management, Jul. 2009, pp. 38-45.

(Continued)

*Primary Examiner* — Mahesh Dwivedi
(74) *Attorney, Agent, or Firm* — VanLeeuwen & VanLeeuwen; Diana R. Gerhardt (57) ABSTRACT

An approach is provided for updating corpora in a Question and Answer (QA) system. Ingestion of a first set of sources into a first corpus and a second set of sources into a second corpus with the second set of sources including updates to the first set of sources. A question is received. The system identifies candidate answers to the question using the sources included in the corpuses. Each candidate answer has a weighting. The system determines whether the first and second corpuses have an overlapping source from which two candidate answers were identified. If an overlapping source is found, the candidate answer from the overlapping source in the first corpus is assigned a lower weighting than the candidate answer from the second corpus. Likely answers are selected from the candidate answers based on the weighting and returned to the requestor.

7 Claims, 8 Drawing Sheets

(58) Field of Classification Search
USPC .......................................................... 707/709
See application file for complete search history.

(56) References Cited

U.S. PATENT DOCUMENTS

| | | | |
|---|---|---|---|
| 2008/0021860 A1* | 1/2008 | Wiegering | G06F 17/30864 |
| 2012/0077178 A1* | 3/2012 | Bagchi | G09B 7/00 |
| | | | 434/362 |
| 2012/0246154 A1 | 9/2012 | Duan et al. | |
| 2013/0017524 A1 | 1/2013 | Barborak et al. | |
| 2013/0159274 A1* | 6/2013 | Silberstein | H04L 67/20 |
| | | | 707/706 |
| 2013/0304730 A1* | 11/2013 | Zhou | G06F 17/30864 |
| | | | 707/723 |
| 2015/0169574 A1* | 6/2015 | Bau | G06F 17/30268 |
| | | | 707/725 |
| 2015/0347587 A1* | 12/2015 | Allen | G06F 17/30654 |
| | | | 707/725 |
| 2016/0048514 A1* | 2/2016 | Allen | G06F 17/3043 |
| | | | 707/731 |

OTHER PUBLICATIONS

Anonymous, "Explaining why question-and-answer system answers change over time by listing the most relevant changes to the question-and-answer system," ip.com, IPCOM000234018D, Jan. 7, 2014, 5 pages.

Anonymous, "Automatically answer questions asked of me based on my previous answers to similar questions," ip.com, IPCOM000234119D, Jan. 13, 2014, 3 pages.

Anonymous, "Method to extract simple and compound terms from text corpuses (without performing full semantic analysis)," ip.com, IPCOM000220204D, Jul. 25, 2012, 6 pages.

Jamrog et al, "Realtime Ingestion via Multi-Corpus Knowledge Base with Weighting," U.S. Appl. No. 14/517,813, filed Oct. 18, 2014, 38 pages.

* cited by examiner

REALTIME INGESTION VIA MULTI-CORPUS KNOWLEDGE BASE WITH WEIGHTING

BACKGROUND OF THE INVENTION

A question answering (QA) computing system applies advanced natural language processing, information retrieval, knowledge representation, automated reasoning, and machine learning technologies to the field of open domain question answering. The key difference between QA technology and document search is that document search takes a keyword query and returns a list of documents, ranked in order of relevance to the query (often based on popularity and page ranking), while QA technology takes a question expressed in natural language, seeks to understand it in much greater detail, and returns a precise answer to the question.

In order to answer a broad array of questions, QA systems rely on vast amounts of up-to-date information. QA Systems need current documents and information in order to more accurately answer questions, especially questions that are time sensitive questions. Currently such technologies are limited by the time it takes considerable to rebuild the information corpora used by the QA system during runtime.

SUMMARY

An approach is provided for updating corpora in a Question and Answer (QA) system. The system ingests a first set of sources into a first corpus and a second set of sources into a second corpus with the second set of sources being a subset of the first set of sources. The second set of sources include updates to the first set of sources. The system receives a question from a requestor and, based on the question, identifies candidate answers to the question using the sources included in the first and second corpuses. Each of the candidate answers has a weighting associated with it. The system determines whether the first and second corpuses have an overlapping source from which two of the candidate answers were identified. If an overlapping source is found, then the candidate answer that came from the overlapping source in the first corpus is assigned a lower weighting than the candidate answer that came from the second corpus. Likely answers are selected from the candidate answers with the selection based on the weighting associated with the candidate answers. These selected likely answers are returned to the requestor.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
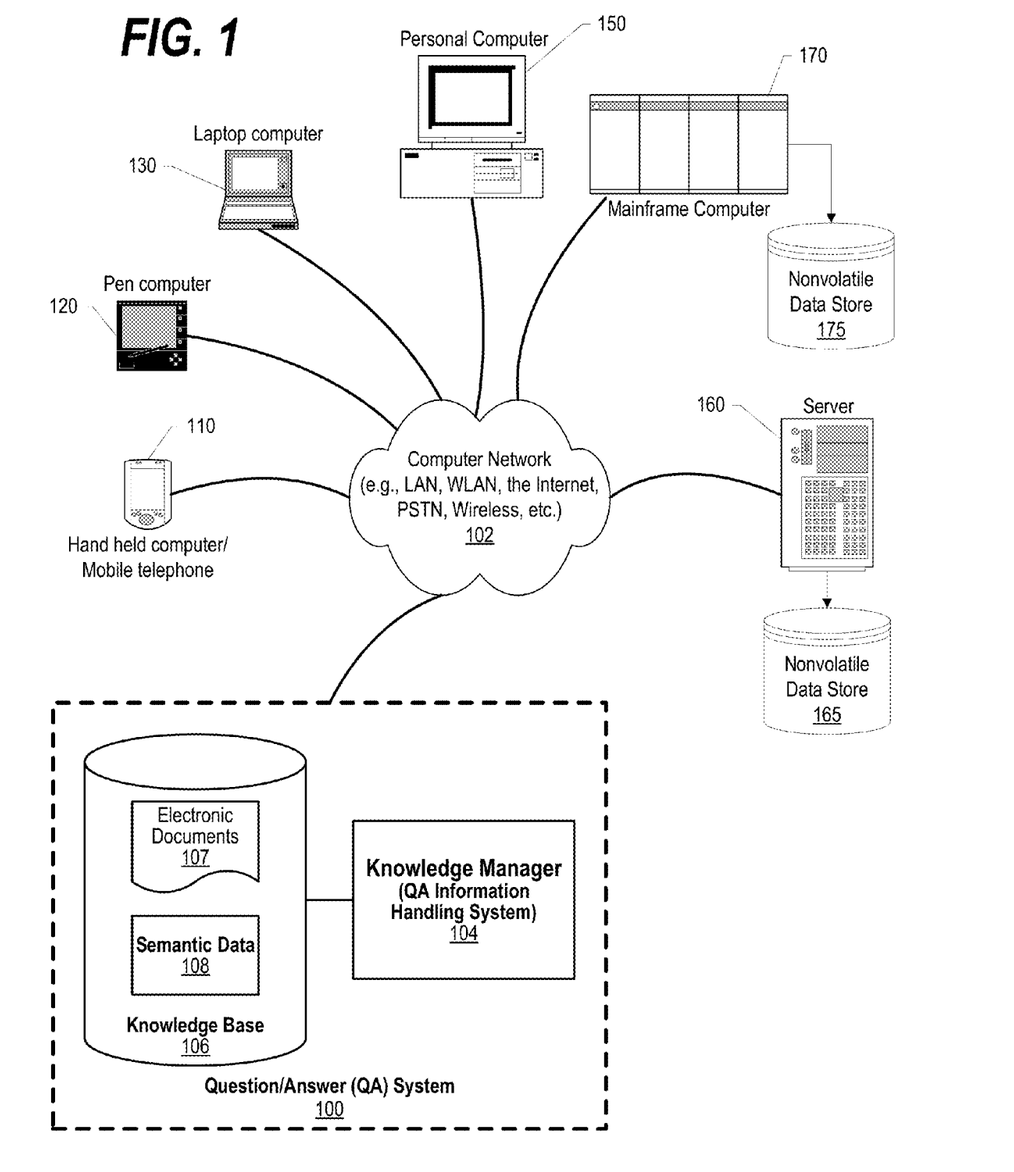
FIG. 1 depicts a network environment that includes a knowledge manager that utilizes a knowledge base.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
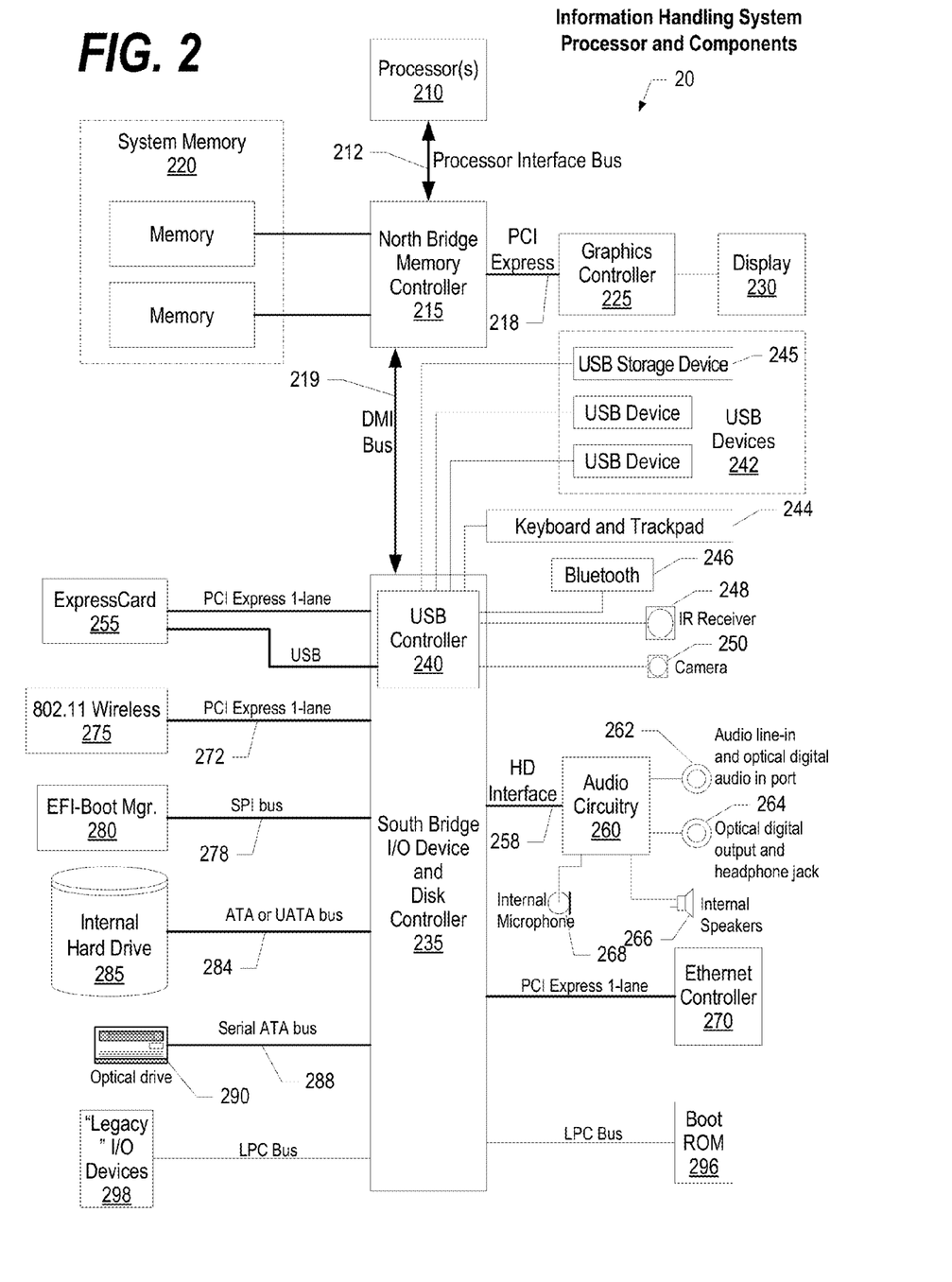
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system to perform real-time ingestion of a multi-corpus knowledge base with weighting used by a Question/Answer (QA) system, such as QA System 100 shown in FIG. 1. By utilizing a multi-corpora setup, the approach allows data to be ingested into a stand-alone corpus and added to a running QA System. This follow-up corpora is an update to existing digests and therefore might have more accurate answers or corrections to the previously ingested data. Through the use of a dynamic weighting algorithm during query composition, the approach determines which corpus in the multi-corpora environment provides greater accuracy to an answer posed by a requestor. This approach provides modifications to both the way data is ingested into the corpora as well as how data is weighted for generation of candidate answers.

In this manner, the approach improves on existing computer technology by providing more relevant answers to questions in a QA system when the data supporting the answers changes over time as reflected in updates to the corpora since the original corpora was ingested into the system. The approach determines during ingestion time which corpora our latest data might be updating, and creates a retrievable notation of the potential overlapping data contained in the original and updated corpora. The approach further creates an independent new updated corpora which can be added to an existing corpora currently in use by a QA system. The QA system decomposes questions posed by requestors and determines if the information requested is of a current or historical nature. The approach weights the results from the multi-corpora with the more relevant temporal nature weighted higher than older results included in the original corpora.

Figure 3:
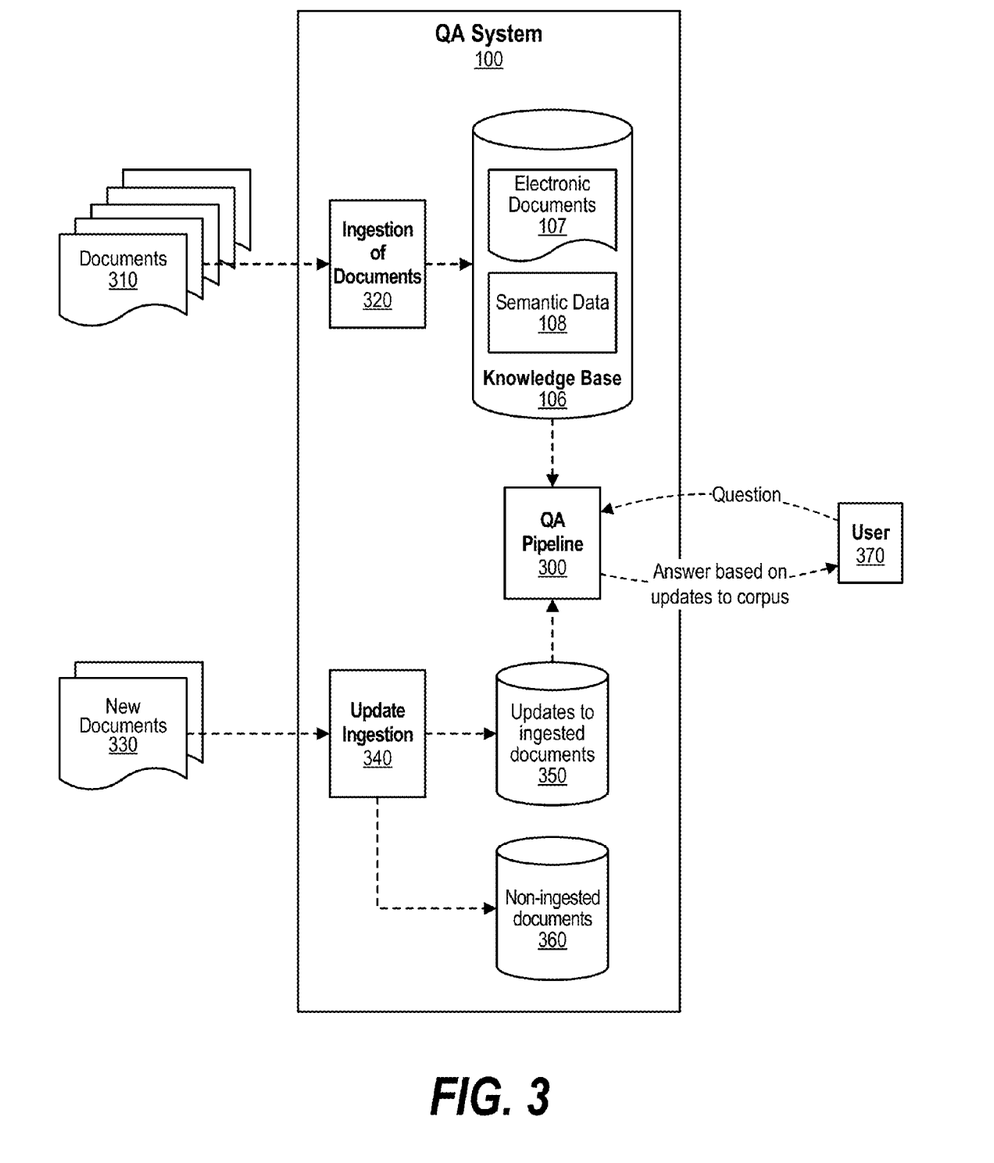
FIG. 3 is a component diagram depicting the various components that perform real-time ingestion of a multi-corpus knowledge base with weighting used by the question answering (QA) system.

FIG. 3 is a component diagram depicting the various components that perform real-time ingestion of a multi-corpus knowledge base with weighting used by question answering (QA) system 100. Process 320 ingests information from documents, such as newspapers, periodicals, etc., and the information is added to the corpora, or knowledge base 106, that is utilized by the QA system to answer user questions.

User 370 poses a question to QA system. QA Pipeline 300 is a process utilized by QA system 100 to interpret, understand, and answer the question posed by the user. The QA system retrieves data from single corpus (knowledge base 106) in order to identify candidate answers that are returned to user 370. In addition, as discussed below, QA Pipeline 300 also utilizes updated information from secondary corpus 350 that is provided by the QA system's update ingestion process 340.

An update to all or part of the input is published (e.g., daily, weekly, monthly, etc.) as new documents 330. These new documents are ingested using the QA system's update ingestion process 340. The update ingestion process identifies those new documents that provide updated information to previously ingested documents. Such documents that provide updated information (e.g., additional information, clarification of missing or incorrect information in original documents 310, etc.) are ingested to a secondary corpus 350. When answering a user's question, QA Pipeline process 300 utilizes both primary corpus (first corpus) 106 as well as secondary corpus (second corpus 350). During update ingestion process 340, new documents 330 are analyzed and the process recognizes when data is an update (such as a redaction) to previously ingested data and the two corpus are considered overlapping.

Subsequent to update ingestion processing, when a question (possibly the same question as originally submitted) is asked QA system 100 will consider the additional corpus 350 for candidate answers as well as primary corpus 106. During scoring of candidates a weight is now calculated and applied to results of the corpus based on the relative input dates of the corpus. For example, conflicting or overlapping information from the secondary corpus is given more weight than from the primary corpus.

By way of an example, assume that an original document, such as a newspaper, was included in documents 310 that indicated that the primary suspect of a crime that occurred over the weekend was "Jane Doe." This information is ingested using process 320 and included in first corpus 106. At this point, if a user asks the QA system for the primary suspect of the crime, the QA system would respond with "Jane Doe." Subsequently, a redaction or clarification is published (e.g., in a subsequent newspaper edition, etc.) and included in the set of new documents 330 that clarifies that "John Doe" is the suspect rather than the originally published "Jane Doe." The updated information is included in second corpus 350 by update ingestion process 340. Now, when a user asks the QA system for the name of the primary suspect of the crime, the result, or answer, from the QA system will be "John Doe" rather than the incorrect answer of "Jane Doe."

Figure 4:
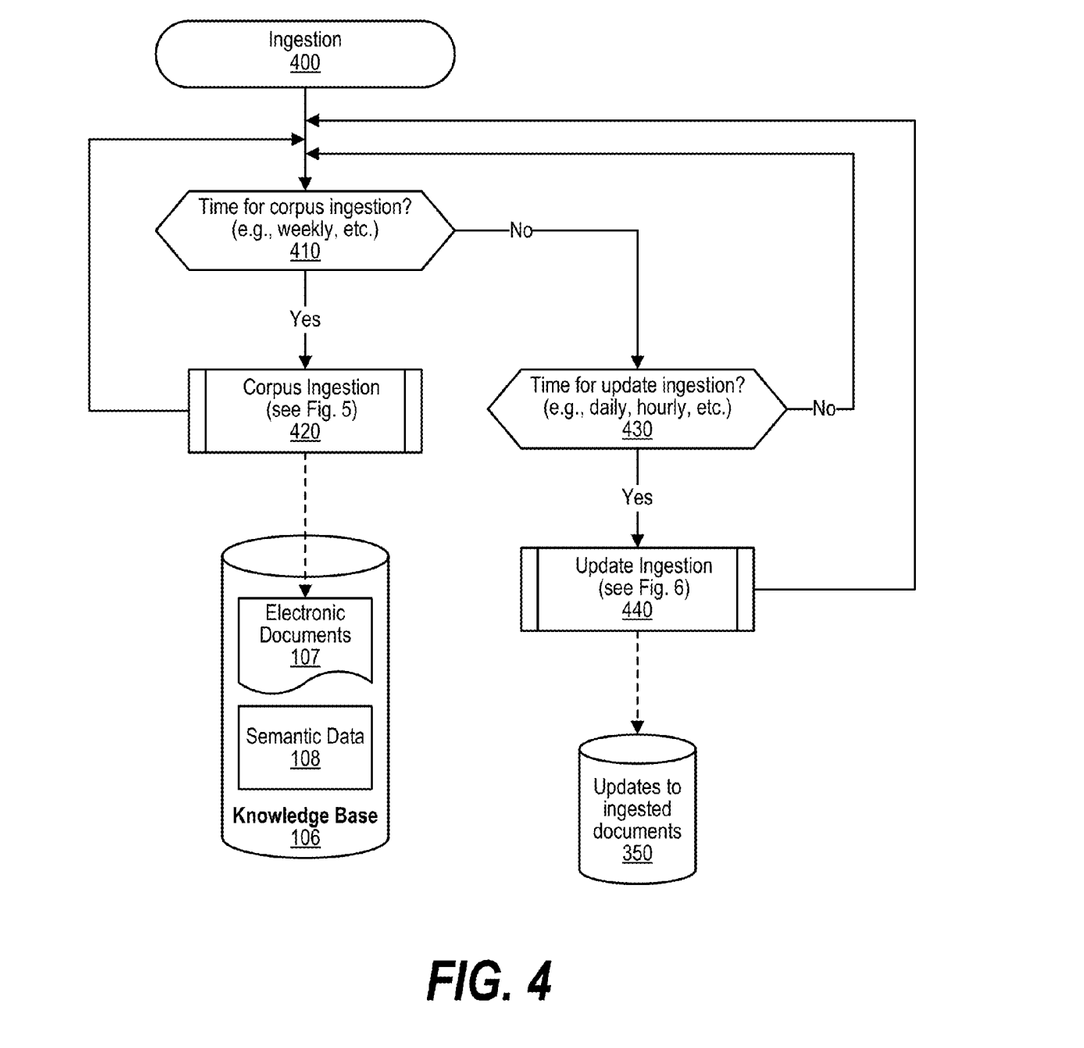
FIG. 4 is a depiction of a flowchart showing the high level logic used in ingesting documents to the multi-corpus knowledge base used by the QA system.

FIG. 4 is a depiction of a flowchart showing the high level logic used in ingesting documents to the multi-corpus knowledge base used by the QA system. FIG. 4 commences at 400 and shows the steps taken by a process that performs ingestion processing for the QA system.

The process determines as to whether it is time to perform a regular corpus ingestion (decision 410). If it is time to perform regular corpus ingestion, then decision 410 branches to the 'yes' branch whereupon, at predefined process 420, the process performs the Corpus Ingestion routine (see FIG. 5 and corresponding text for processing details). Predefined process 420 stores the results of regular corpus ingestion in a first corpus, or knowledge base, 106.

Returning to decision 410, if it is not time to perform regular corpus ingestion, then decision 410 branches to the 'no' branch whereupon the process next determines whether it is time to perform the update ingestion process (decision 430). If it is time to perform the update ingestion process, then decision 430 branches to the 'yes' branch, whereupon at predefined process 440 the Update Ingestion routine is performed (see FIG. 6 and correspond text for processing details). Predefined process 440 stores the results of the update ingestion routine in a second corpus shown here as Updates to Ingested Documents data store 350. On the other hand, if it is not time to perform the update ingestion process, then decision 430 branches to the 'no' branch which loops back to the top of the routine. The process continually loops back to the beginning of the routine to perform the regular and update corpus ingestion processes at the scheduled, or triggered times. For example, the update ingestion routine could be performed based on a trigger such as when new documents are available for analysis and possible ingestion.

Figure 5:
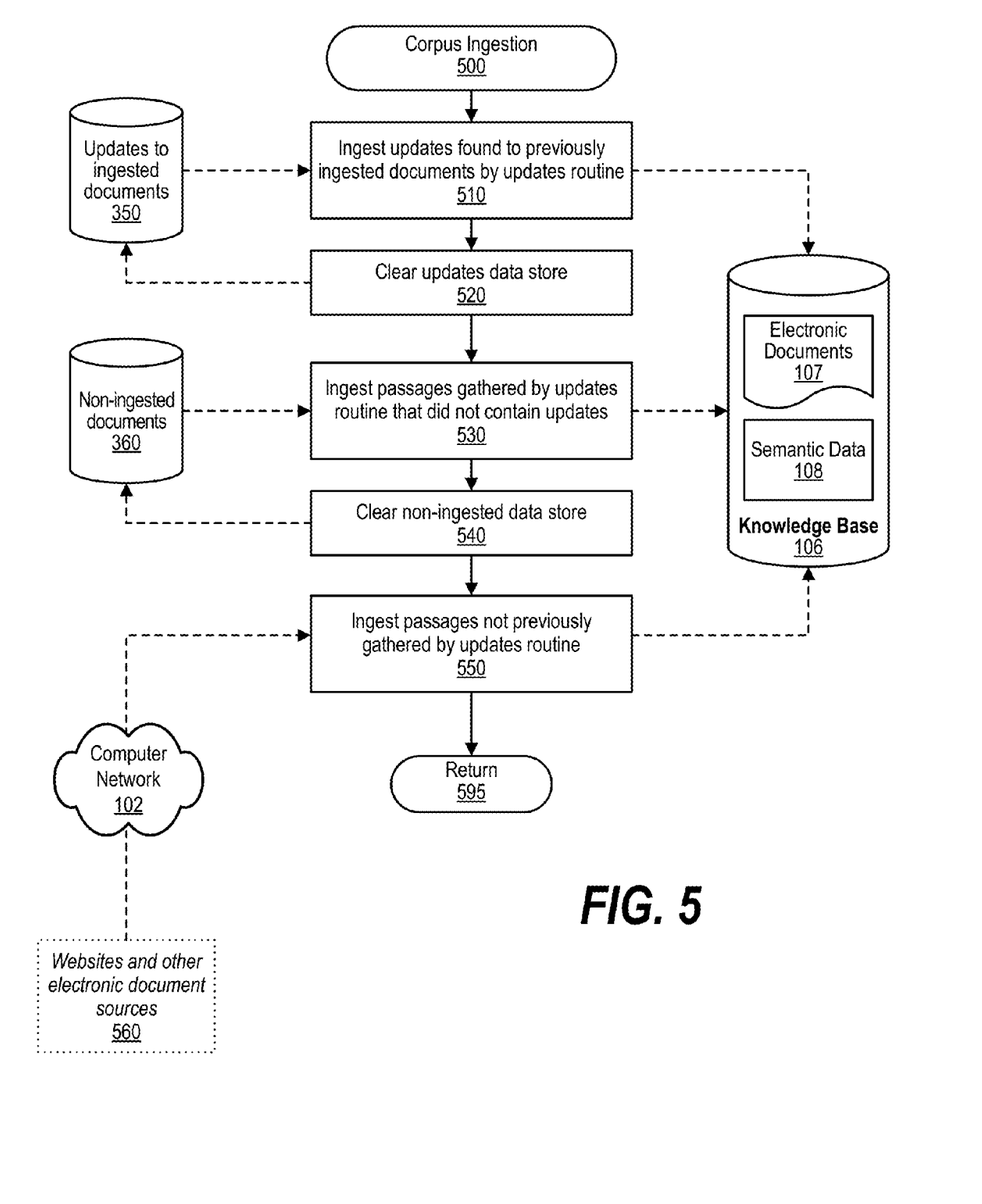
FIG. 5 is a depiction of a flowchart showing the logic performed in corpus ingestion of documents to the corpus utilized by the QA system.

FIG. 5 is a depiction of a flowchart showing the logic performed in corpus ingestion of documents to the corpus utilized by the QA system. FIG. 5 processing commences at 500 and shows the steps taken by a process that performs that performs regular corpus ingestion.

At step 510, the process ingests updates found to previously ingested documents by update ingestion routine. The updates were stored in second corpus 350 by the update ingestion routine. Step 510 merges the second corpus into the first corpus, or knowledge base, 106. At step 520, the process clears updates data store 350 to prevent duplicate updates from being merged into first corpus 106.

At step 530, the process ingests passages gathered by the update ingestion routine that did not contain updates. During the update ingestion routine, documents that were processed that did not contain updates to data already ingested into first corpus 106 were stored in data store 360. Step 530 processes these non-ingested documents and includes them into first corpus, or knowledge base, 106. At step 540, the process clears non-ingested data store 360 to prevent the same documents from being re-ingested into first corpus 106 during subsequent execution of this routine.

At step 550, the process ingests passages not previously gathered by the update ingestion routine. In one embodiment, the update ingestion routine checks for updates from a subset of document sources, such as newspapers and periodicals. In such an embodiment, documents from additional document sources are gathered during the regular ingestion routine. The routine gathers such additional documents from websites and other electronic document sources 560 which are accessible via computer network 102, such as the Internet. FIG. 5 processing thereafter returns to the calling routine (see FIG. 4) at 595.

Figure 6:
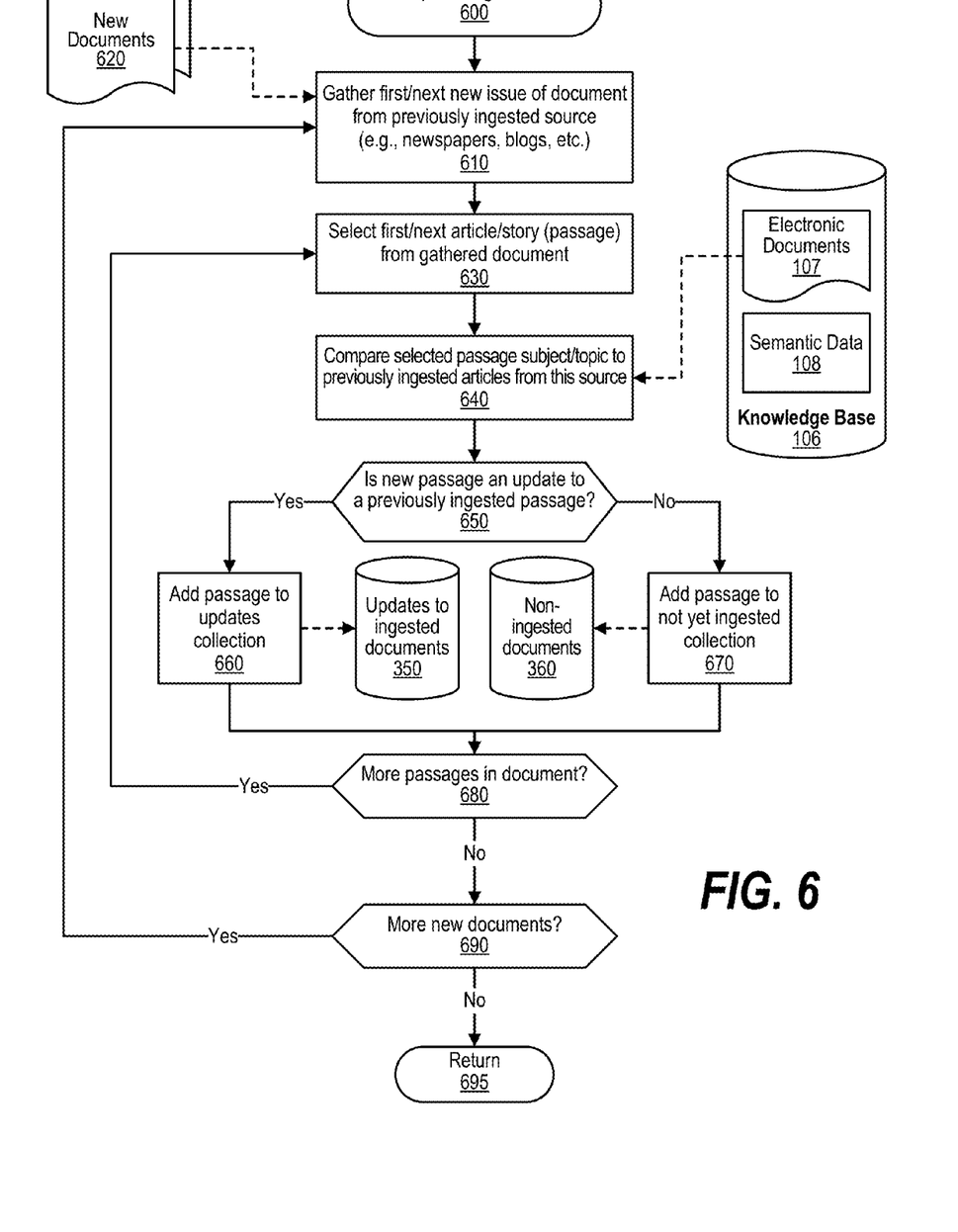
FIG. 6 is a depiction of a flowchart showing the logic used during an update ingestion process that ingests updated documents to the multi-corpus knowledge base utilized by the QA system.

FIG. 6 is a depiction of a flowchart showing the logic used during an update ingestion process that ingests updated documents to the multi-corpus knowledge base utilized by the QA system. FIG. 6 processing commences at 600 and shows the steps taken by a process that performs the update ingestion routine.

At step 610, the process gathers the first new issue of a document from a previously ingested source (e.g., newspapers, periodicals, blogs, etc.). New documents 620 are retrieved electronically, such as over a computer network such as the Internet. At step 630, the process selects the first article or story (passage) from the gathered document. At step 640, the process compares the selected passage's subject or topic to the passages (e.g., articles, etc.) previously ingested from this source by the regular ingestion routine that was shown in FIG. 5. The previously ingested passages are retrieved from first corpus, or knowledge base, 106.

The process determines as to whether the selected passage is an update to a previously ingested passage (decision 650). If the selected passage is an update to a previously ingested passage, then decision 650 branches to the 'yes' branch whereupon, at step 660, the process adds the selected passage to the updates collection that is the second corpus (data store 350).

On the other hand, if the selected passage is not an update to a previously ingested passage, then decision 650 branches to the 'no' branch whereupon, at step 670, the process adds the passage to the collection of not yet ingested documents (data store 360).

The process determines as to whether more passages in the gathered document to process (decision 680). If there are more passages in the document to process, then decision 680 branches to the 'yes' branch which loops back to step 630 in order to select the next passage from the document. This looping continues until all of the passages from the gathered document have been processed, at which point decision 680 branches to the 'no' branch.

The process next determines as to whether there are more new documents to gather (decision 690). If there are more new documents to gather, then decision 690 branches to the 'yes' branch which loops back to step 610 to gather the next document from new documents collection 620. This looping continues until there are no more new documents to gather, at which point decision 690 branches to the 'no' branch and processing returns to the calling routine (see FIG. 4) at 695.

Figure 7:
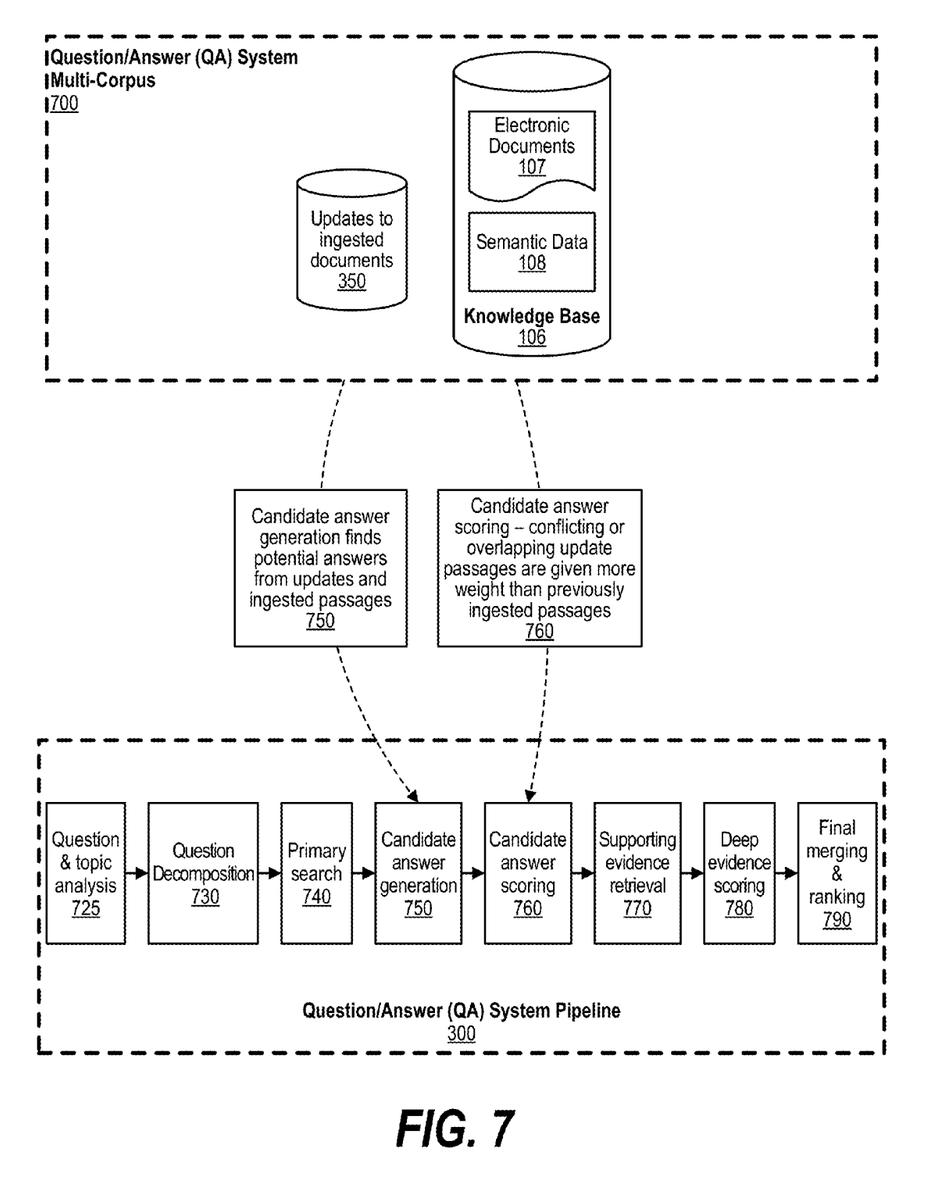
FIG. 7 is a component diagram depicting the various components of the QA system that answers questions posed by requestors using the multi-corpus knowledge base with weighting based on document updates.

FIG. 7 is a component diagram depicting the various components of the QA system that answers questions posed by requestors using the multi-corpus knowledge base with weighting based on document updates. Multi-corpus 700 shows the multiple corpuses being utilized by the QA system. First corpus 106 is updated using the regular corpus ingestion processing shown in FIG. 5, while second corpus 350 is updated using the update corpus ingestion processing shown in FIG. 6.

QA system pipeline 300 is broken down to depict many of the individual pipeline steps included in the QA system pipeline. At step 725, the QA system pipeline performs the question and topic analysis process. At step 730, the QA system pipeline performs the question decomposition process. At step 740, the QA system pipeline performs the primary search process. At step 750, the QA system pipeline performs the candidate answer generation process. At step 760, the QA system pipeline performs the candidates answer scoring process. At step 770, the QA system pipeline performs the supporting evidence retrieval process. At step 780, the QA system pipeline performs the deep evidence scoring process. At step 790, the QA system pipeline performs the final merging and ranking process.

Many of the steps can utilize the multiple corpuses. Two of the steps that utilize the multiple corpuses are the candidate answer generation step (step 750) and the candidate answer scoring step (step 760). At step 750, the pipeline's candidate answer generation process finds potential answers from both the updates (second corpus data store 350) as well as from ingested passages (first corpus data store 106). At step 760, the process performs candidates answer scoring. In step 760, conflicting or overlapping update passages are given more weight than previously ingested passages. Further detail regarding both steps 750 and 760 are shown in FIG. 8.

Figure 8:
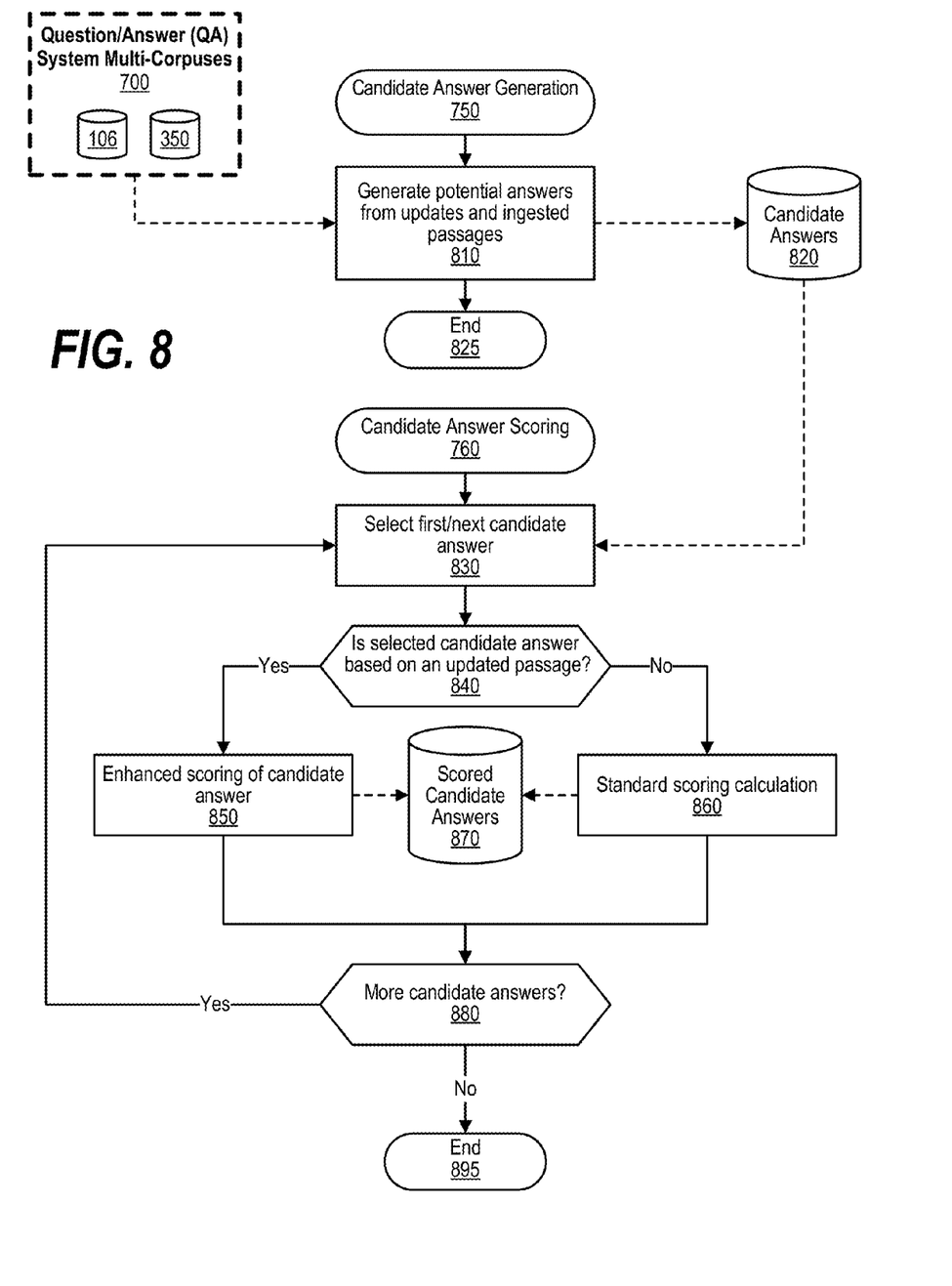
FIG. 8 is a depiction of a flowchart showing the logic used when the QA system answers questions posed by requestors using the multi-corpus knowledge base with weighting based on document updates.

FIG. 8 is a depiction of a flowchart showing the logic used when the QA system answers questions posed by requestors using the multi-corpus knowledge base with weighting based on document updates.

The Candidate Answer Generation process commences at 750. At step 810, the candidate answer generate process generates potential answers from updates and ingested passages found in multiple corpuses 700. The multiple corpuses include corpus 106 which is generated by the regular document ingestion process shown in FIG. 5 as well as update corpus 350 which is generated by the update ingestion process shown in FIG. 6. The candidate answers generated by step 810 are stored in candidate answers data store 820. Candidate answer generation processing thereafter ends at 825.

The Candidate Answer Scoring process commences at 760. At step 830, the process selects the first candidate answer from data store 820. The process determines as to whether the selected candidate answer is based on an updated passage (decision 840). If the selected candidate answer is based on an updated passage, then decision 840 branches to the 'yes' branch, whereupon, at step 850, the process performs an enhanced scoring of the candidate answer which is stored in scored candidate answers data store 870. On the other hand, if the selected candidate answer is not based on an updated passage, then decision 840 branches to the 'no' branch whereupon, at step 860, the process performs standard (non-enhanced) scoring calculation of the candidate answer and the score is stored in candidate answers data store 870.

The process determines as to whether there are more candidate answers to process (decision 880). If there are more candidate answers to process, then decision 880 branches to the 'yes' branch which loops back to step 830 to select and process the next candidate answer. This looping continues until all candidate answers have been processed, at which point decision 880 branches to the 'no' branch and the Candidate Answer Scoring routine ends at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of answering questions in an information handling system comprising a processor and a memory, the method comprising:
   ingesting, by the system, a first set of sources into a first corpus;
   ingesting, by the system, a second set of sources into a second corpus, wherein the second set of sources are a subset of the first set of sources, and wherein the second set of sources include updates to the first set of sources;
   receiving, by the system, a question from a requestor;
   identifying, by the system, a plurality of candidate answers to the question using one or more sources included in the first and second corpuses, wherein a weighting is associated with each of the candidate answers;
   determining, by the system, whether the first and second corpuses have an overlapping source from which two or more of the candidate answers were identified;
   in response to determining the overlapping source, assigning, by the system, a first candidate answer from the overlapping source in the first corpus with a lower weighting than a second candidate answer from the overlapping source in the second corpus;
   selecting one or more likely answers from the plurality of candidate answers, wherein the selecting is based on the weighting associated with the respective candidate answers; and
   returning the selected likely answers to the requestor.

2. The method of claim 1 further comprising:
   ingesting a first set of passages from the first set of sources into the first corpus;
   selecting a second set of passages from the second set of sources, wherein the selection is based on each of the second set of passages being an update to at least one of the first set of passages; and
   ingesting the selected second set of passages into the second corpus.

3. The method of claim 2 wherein the ingestion into the first corpus is performed on a first ingestion cycle and the ingestion into the second corpus is performed on a second ingestion cycle, wherein the first ingestion cycle occurs less frequently than the second ingestion cycle, and wherein the method further comprises:
- including unselected passages from the second set of sources in a data store; and
- ingesting the unselected passages into the first corpus during a next first ingestion cycle.

4. The method of claim 3 further comprising:
- ingesting the second set of passages into the first corpus during the next first ingestion cycle; and
- clearing the second set of passages from the second corpus after ingestion of the second set of passages into the first corpus.

5. The method of claim 1 further comprising:
- associating an input date corresponding to each of the first and second set of sources, wherein the assigning of the lower weighting to the overlapping source in the first source is also based on the input date of the overlapping source in the first corpus being earlier than the input date of the overlapping source in the second corpus.

6. The method of claim 1 further comprising:
- ingesting, into the first corpus, a first set of one or more passages from a first source selected from the first set of sources; and
- identifying a second set of one or more passages from a second source selected from the second set of sources, wherein the identification is based on the second set of passages being an update to the first set of passages and the second source being the same as the first source.

7. The method of claim 6 wherein the first and second sources are selected from the group consisting of a newspaper, a magazine, a journal, and a periodical.

* * * * *